(12) United States Patent
James

(10) Patent No.: US 11,917,064 B2
(45) Date of Patent: Feb. 27, 2024

(54) TOKEN TRANSFORMATION FILTER FOR THE SERVICE MESH

(71) Applicant: ForgeRock, Inc., San Francisco, CA (US)

(72) Inventor: Nicholas P. James, Bristol (GB)

(73) Assignee: ForgeRock, Inc., San Francisco, CA (US)

( * ) Notice: Subject to any disclaimer, the term of this patent is extended or adjusted under 35 U.S.C. 154(b) by 196 days.

(21) Appl. No.: 17/542,283

(22) Filed: Dec. 3, 2021

(65) Prior Publication Data

US 2023/0179417 A1 Jun. 8, 2023

(51) Int. Cl.
*H04L 9/32* (2006.01)
*H04L 9/40* (2022.01)
*H04L 67/02* (2022.01)

(52) U.S. Cl.
CPC ............ *H04L 9/3213* (2013.01); *H04L 63/10* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 11,431,513 | B1* | 8/2022 | Cannata | H04L 9/3213 |
| 11,595,215 | B1* | 2/2023 | Madden | H04L 63/0807 |
| 11,595,389 | B1* | 2/2023 | Madden | H04L 9/0643 |
| 2018/0075231 | A1* | 3/2018 | Subramanian | H04L 63/0807 |
| 2018/0219863 | A1* | 8/2018 | Tran | H04W 12/06 |
| 2019/0097802 | A1* | 3/2019 | Rowe | H04L 9/3213 |
| 2020/0059360 | A1* | 2/2020 | Martynov | H04L 63/08 |
| 2020/0084202 | A1* | 3/2020 | Smith | H04L 41/5003 |
| 2020/0320489 | A1* | 10/2020 | Vagare | H04L 9/0838 |
| 2020/0374274 | A1* | 11/2020 | Momchilov | H04L 9/0825 |

(Continued)

OTHER PUBLICATIONS

Jones etal, RFC 8693, OAuth 2.0 Token Exchange, Internet Engineering Task Force (IETF), Jan. 2020, 27 pages (https://www.rfc-editor.org/rfc/rfc8693.pdf).

(Continued)

*Primary Examiner* — Michael Pyzocha
(74) *Attorney, Agent, or Firm* — Haynes Beffel & Wolfeld LLP; Ernest J. Beffel, Jr.; Jason Liao

(57) ABSTRACT

The disclosed technology teaches granular sharing of parts of an authorization token among individual microservices in a microservice chain, including packaging in an encrypted token base information used by the chain, overall, and respective individual portions of information for respective microservices in the chain. Also disclosed is receiving the token, with a service request message, at an entry point to the chain, decrypting the base information and verifying authorization for initiation of the service chain with an authorization service. Further disclosed is routing the service request and the encrypted token among the microservices in the chain, and at each respective microservice, applying a local transform to a respective individual portion of information and making the individual portion of information available for processing at the respective microservice, and the respective microservice consuming its own individual portion of information without having access to additional individual portions of information directed to other microservices.

21 Claims, 6 Drawing Sheets

(56) References Cited

U.S. PATENT DOCUMENTS

| | | | | |
|---|---|---|---|---|
| 2020/0396077 | A1* | 12/2020 | Wojcik | H04L 9/088 |
| 2021/0203662 | A1* | 7/2021 | Calegari | H04L 63/102 |
| 2021/0250361 | A1* | 8/2021 | Leibmann | H04L 63/105 |
| 2021/0289005 | A1* | 9/2021 | Chacko | H04L 63/306 |
| 2021/0306321 | A1* | 9/2021 | Calegari | H04L 63/108 |
| 2021/0328793 | A1* | 10/2021 | Saravanan | G06F 21/53 |
| 2022/0224535 | A1* | 7/2022 | Coffing | H04L 63/101 |
| 2022/0377064 | A1* | 11/2022 | Raj | H04L 9/3213 |
| 2022/0394039 | A1* | 12/2022 | Deodurg | H04L 63/102 |

OTHER PUBLICATIONS

Data et al, Critical Capabilities for Access Management, Gartner Reprints, Nov. 9, 2021, 31 pages.

Pods Documentation, Kubernetes.io, Oct. 17, 2021, 45 pages (downloaded Dec. 3, 2021 from https://kubernetes.io/docs/concepts/workloads/pods/).

Top 10 Istio Alternatives and Competitors, G2.com, 2021, 8 pages (downloaded Oct. 5, 2021 from https://www.g2.com/products/istio/competitors/alternatives).

System architecture, Cloud Identity, 1 page (downloaded from Dec. 3, 2021 from https://docs.authorization.cloudentity.com/acp_overview/architecture/).

Cloud Identity White Paper Achieving Zero Trust Microservices, Cloud Identity, 8 pages (downloaded from https://cloudentity.com/resource-center/), 2021.

Cloud Identity Authorization Governance Automation, 2021, 6 pages (downloaded Oct. 4, 2011 from https://f.hubspotusercontent40.net/hubfs/3824547/Aug%202021%20Landing%20Pages/Cloudentity-Authorization-Governance-Automation-ExecOverview-EXTWP-EXECO-2107.2.pdf).

Michael, S., The Service Mesh Landscape in 2021, Speedscale, Jul. 7, 2021, 8 pages (downloaded Jul. 7, 2021 from https://speedscale.com/2021/07/07/the-service-mesh-landscape-in-2021/).

Lodderstedt T. et al, Web Authorization Protocoll OAuth 2.0 Rich Authorization Requests, Internet Engineering Task Force (ietf.org), Aug. 21, 2020, 31 pages (downloaded from https://tools.ietf.org/pdf/draft-ietf-oauth-rar-02.pdf).

The Istio service mesh, Istio.io, 7 pages (downloaded from Sep. 28, 2021 from https://istio.io/latest/about/service-mesh/).

* cited by examiner ly, but is not limited to, US 11,917,064 B2
TOKEN TRANSFORMATION FILTER FOR THE SERVICE MESH

RELATED APPLICATIONS

This application is related to the following:

U.S. application Ser. No. 16/579,740 titled: "Secure Service Isolation Between Instances of Cloud Products Using a SaaS Model", filed Oct. 1, 2019, now U.S. Pat. No. 10,817,346.

U.S. application Ser. No. 17/068,653 titled: "Secure Service Isolation Between Instances of Cloud Products Using a SaaS Model", filed Oct. 12, 2020.

The related applications are incorporated by reference for all purposes.

FIELD OF THE TECHNOLOGY DISCLOSED

The technology disclosed relates generally to identity and access management (IAM) and delegating authorization for access to resources. More specifically the disclosed technology relates to safely using access tokens for confirming delegation of authorization from an authorization server to a service, by a client. The disclosed technology also relates to granular sharing of parts of an authorization token among individual microservices in a microservice chain. The technology disclosed further relates to adapting a microservice proxy, within an individual microservice in a microservice chain, to access an individual portion of information packaged with base information applicable to the chain, overall, in an encrypted token.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Dynamic scalability of access management (AM) services, along with high availability and reduced need for support staff, have become more important, resulting in software as a service (SaaS) being the dominant delivery model for AM. With distributed applications and microservices becoming more and more popular across the software engineering landscape, many developers are finding that the complexity of communication between these services has become unmanageable. Cloud applications are separated into small processing units known as microservices, which can be replicated and shut down depending on demand. These cloud applications depend on very fast inter-process communication, which cannot feasibly be interrupted by calls back to an authentication server for token exchange or validation. The cloud application microservices depend on fast inter-communication, which can be provided by service mesh technology. The microservices typically have security requirements and pass around authorization tokens.

In one example of security requirements, the security managers of a large multi-vendor cloud-based financial services application need to implement zero-trust policies with trust boundaries between application services, and they are concerned about information leaking via authorization tokens. In another example, a cloud application uses a large number of containers, and needs to distribute the responsibility of cryptography and token transformation to maintain throughput. These examples illustrate the motivation for delegating the production of highly specific tokens for services.

An opportunity arises for granular sharing of parts of an authorization token among individual microservices in a microservice chain.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
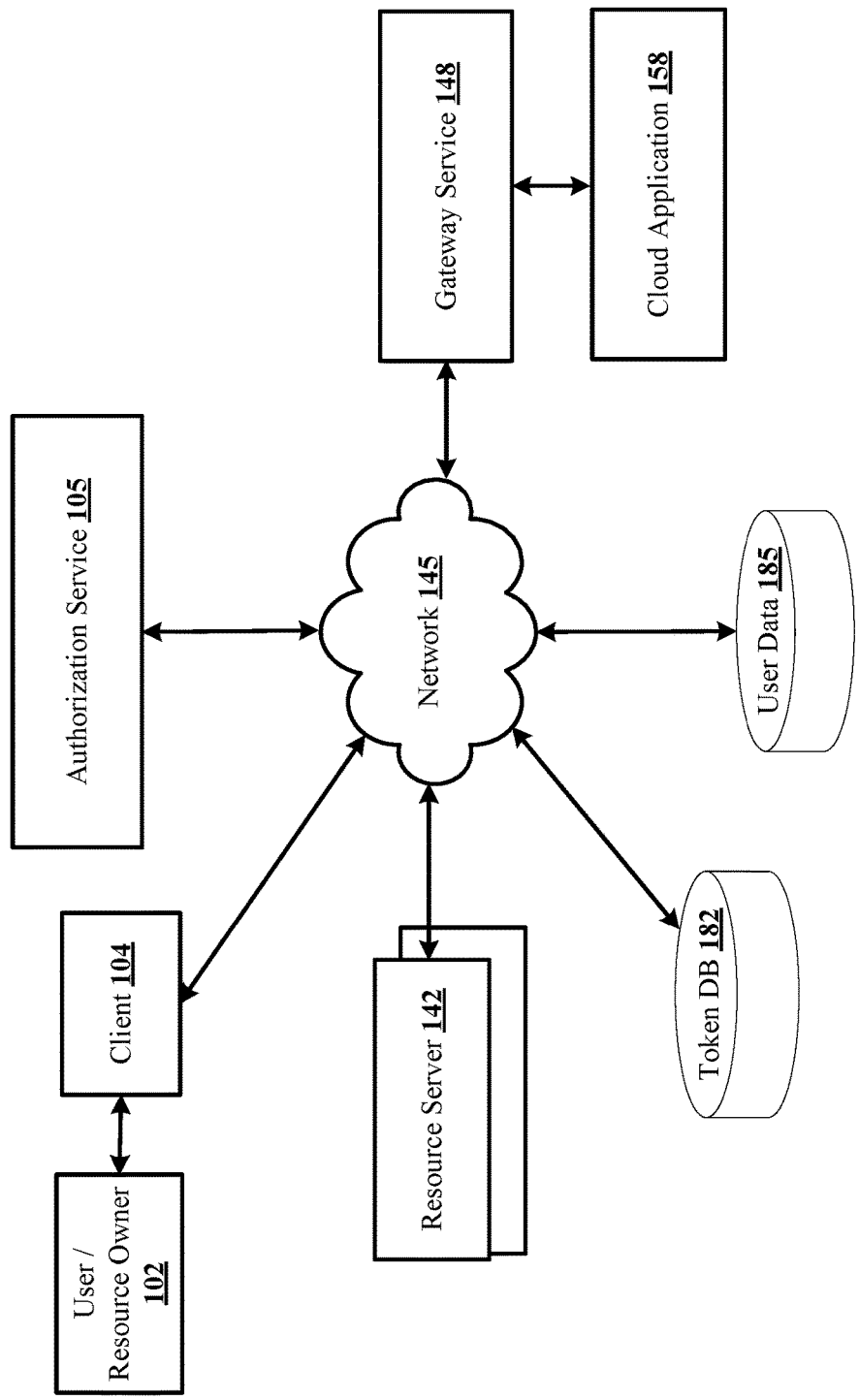
FIG. 1 shows an architectural level diagram of a system for granular sharing of parts of an authorization token among individual microservices in a microservice chain, according to one embodiment of the disclosed technology.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Large multi-vendor cloud applications utilize zero-trust policies, with trust boundaries between application services, to avoid compromising security standards. This results in a demand for enforcing zero-trust practices for authorization tokens in the multi-vendor cloud applications, and enterprises are concerned about information leaks via authorization tokens. The disclosed technology addresses this concern.

A cloud application depends on fast interconnects between multiple services, often maintained by different organizational units, often across trust boundaries. In zero-trust environments it is essential that the information used for authorization can be all and only the information needed. Because a cloud application will have many services that have authorization requirements, it is not feasible to rely solely on an authorization server (AS) because that dependency would introduce a single point of failure and incur huge performance costs.

Developers can mitigate challenges caused by container and service sprawl, when developing and deploying a microservice architecture, using service meshes for standardizing and automating communication between services. Mesh infrastructures can be configured to enhance standard authorization practices, with the use of open policy agent (OPA) etc., without oversharing the authorization data.

OAuth 2.0 is an authorization protocol, described by the OAuth 2.0 Authorization Framework (RFC 6749), that allows the approval of one application interacting with another on a user's behalf without giving away the user's password. OAuth uses access tokens as credentials to prove that the client is authorized to make requests to providers of services. Applications use access tokens to make API requests on behalf of a user. The access token represents the authorization of a specific application to access specific parts of a user's data. Access tokens must be kept confidential in transit and in storage, with the only parties seeing the access token being the application, authorization server and resource server; and the tokens only used over an https connection, which is an encrypted channel. OAuth 2.0 offers constrained access to web services without a requirement to expose user credentials to the client applications. In general, OAuth 2.0 access tokens can be associated to either a client application or to a particular user of the client.

OAuth 2.0 Token Exchange (RFC 8693) defines a protocol for an HTTP- and JSON-based Security Token Service (STS) by defining how to request and obtain security tokens from OAuth 2.0 authorization servers, including security tokens employing impersonation and delegation. STS is a service capable of validating a service capable of validating security tokens provided to it and issuing new security tokens in response, which enables clients to obtain appropriate access credentials for resources in heterogeneous environments or across security domains The demand for multi-vendor cloud applications to enforce zero-trust practices for authorization tokens without calling out to other services or external systems is driven by the requirement for service protection without increased latency or reduced resilience.

The patent applicant discloses authorization services of access management (AM) that utilize granular sharing of parts of an authorization token among individual microservices in a microservice chain. The disclosed technology secures these security tokens for zero-trust in large microservice applications by transforming them in real time. The disclosed technology for access authorization in an OAuth2 framework utilizes well-defined parts of the OAuth 2 standard. Disclosed authorization services grant access to resource controller services, and the resource controller can grant secure access tokens in the microservice architecture, using disclosed rules for securing auth tokens autonomously.

Using the disclosed granular sharing of parts of an authorization token among individual microservices, the services cannot access more sensitive data than they need, as identity/consent data in authorization tokens is not leaked to services that do not need the data. Developers can share specific security tokens for their services, without passing them over trust boundaries.

Declarative rules, for distributing authorization data in terms of data structures, provide visibility for the use of authorization and consent data. Security tokens can be minted for services that need to decrypt or cryptographically verify them.

The next section describes an architecture for granular sharing of parts of an authorization token among individual microservices in a microservice chain, and for adapting a microservice proxy, within an individual microservice in a microservice chain, to access an individual portion of information packaged with base information applicable to the chain, overall, in an encrypted token.

Architecture

FIG. 1 shows an architectural level diagram of a system 100 for granular sharing of parts of an authorization token among individual microservices in a microservice chain. Because FIG. 1 is an architectural diagram, certain details are intentionally omitted to improve clarity of the description. The discussion of FIG. 1 is organized as follows. First, the elements of the figure are described, followed by their interconnections. Then, the use of the elements in the system are described in greater detail.

System 100 includes user/resource owner 102 who interacts with client 104 via computers, tablets, cell phones and smart watches. Browser-based applications and third-party applications can also be delivered on additional devices not mentioned here. System 100 also includes authorization server 105, a trusted authority that responds to requests for access, with access tokens, and gateway service 148 that coordinates authentication and consent gathering, and passing of encrypted authorization data into cloud application 158 which runs in services in variable numbers of virtual machines (VM) as described in more detail below. An access token is a sensitive value that represents an assertion from authorization server 105. The access token represents the authorization of a specific application to access specific parts of a user's data, stored in user data 185. Authorization server 105 generates and stores the access tokens in isolated memory, in token database 182, during operation. Access tokens are kept confidential in transit and in storage.

System 100 also includes resource server 142 that handles access-token-authenticated requests from an app, also referred to as client 104 herein, and network 145 which can be a public network or a private network, in different implementations. System 100 can include multiple applications and multiple resource servers. Browser-based applications and third-party applications communicate with authorization server 105 and resource server 142 via posted messages.

In the interconnection of the elements of system 100, network 145 couples user/resource owner 102 to client 104 running on computer, tablet, cell phone, smart watch, with authorization server 105 and resource server 142 in communication. The communication path can be point-to-point over public and/or private networks. Communication can occur over a variety of networks, e.g., private networks, VPN, MPLS circuit, or Internet, and can use appropriate application program interfaces (APIs) and data interchange formats, e.g., REST, JSON, XML, SOAP. The communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX.

Further continuing with the description of the system 100, components of FIG. 1 are implemented by software running on varying types of computing devices. Example devices are a workstation, a server, a computing cluster, a blade server, and a server farm, or any other data processing system or computing device. The engine can be communicably coupled to the databases via a different network connection.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Figure 2:
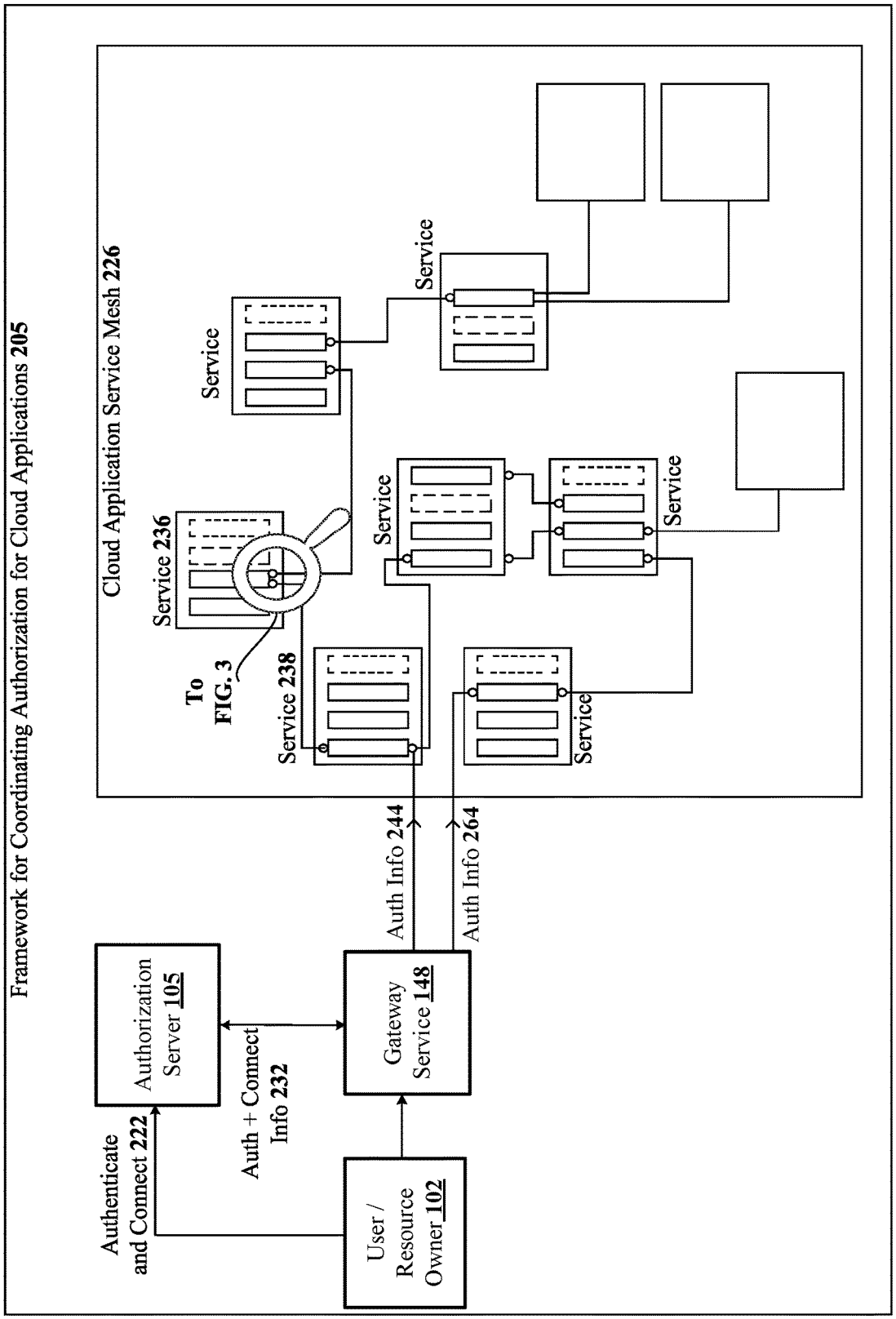
FIG. 2 shows a block diagram of a framework for coordinating authorization for cloud applications implemented via a service mesh.

FIG. 2 shows a block diagram 200 of a framework for coordinating authorization for cloud applications implemented via a service mesh. Framework for coordinating authorization for cloud applications 205 functions to specify access rights/privileges to resources. Cloud application software mesh 226 is the software infrastructure layer for controlling communication between services and for handling the network logic that enables microservice applications to function seamlessly in the cloud-native environment. Authorization flow allows the approval of one application interacting with another on a user's behalf without giving away the user's password. In a typical authorization flow, a user is granting some part of their authority to an app or service for ongoing access. For example, an authorization service might grant an app read-only access to files in a user's Dropbox or Google Drive. In these cases, the scope of access is typically well defined, allowing the client to easily determine what scope to ask for, such as read-all-files, and the grant of authority creates a long-lived relationship between the user and the client. If the user stops using the app, or otherwise decides to end this relationship, they can typically go to a page on the authorization server and revoke access from that client. Framework for coordinating authorization for cloud applications 205 is implemented using a Kubernetes (K8) framework for container orchestration in one example, and in another example can be implemented using virtual machines (VMs).

Figure 3:
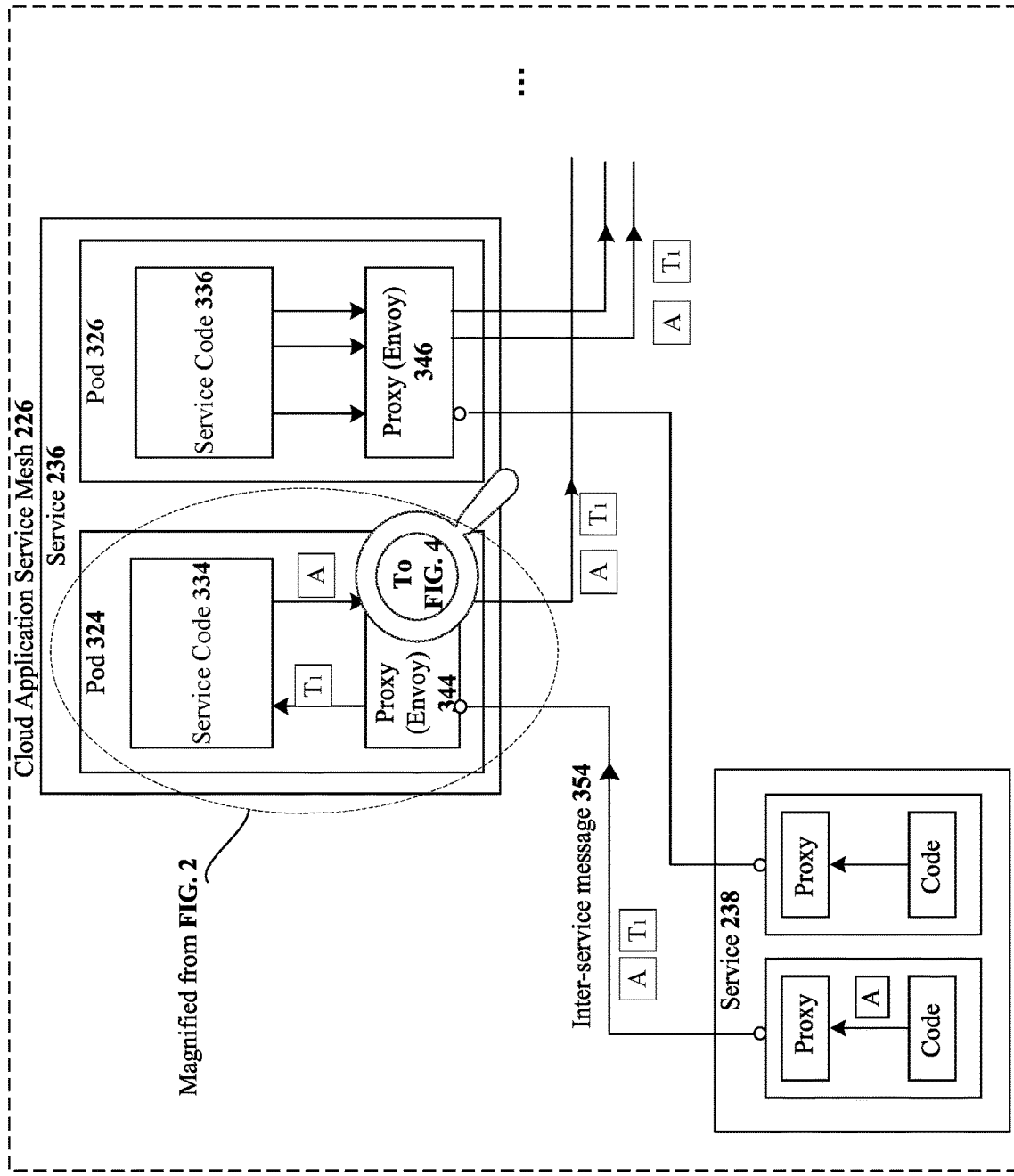
FIG. 3 illustrates details for a pod with two services in a service mesh and the messages that travel from one service to the next service.

Continuing the description of block diagram 200, primary containers have services 236, 238 in cloud application service mesh 226 and can also utilize additional services. Services in cloud application software mesh 226 receive auth info 244, 264 from gateway service 148. User/resource owner 102 uses authorization server 105 to authenticate and connect 222. Gateway service 148 receives the auth and connect info 232 from authorization server 105 for the user/resource owner 102. Framework for coordinating authorization for cloud applications 205 operates autonomously without calling out to authorization server 105. The autonomous operation of the disclosed framework is important because calling out to a central authorization server would be prohibitively slow in the microservice world. FIG. 3 shows details of service 236 in cloud application service mesh 226.

FIG. 3 illustrates details for a pod with two services in cloud application service mesh 226 and the messages that travel from one service 238 to the next service 236. Service 236 has pod 324 and pod 326, and can include multiple additional pods. Proxy 344 of service 236 is implemented in a sidecar, an auxiliary container that attaches to a primary container. K8 instantiates sidecars before the primary containers to which they attach startup and shuts them down after the other containers have terminated. Pod 324 has service code 334 and proxy 344, as shown in the dotted area which is magnified from FIG. 2 and described above. Pod 326 has service code 336 and proxy 346. Cloud application software mesh 226 utilizes Istio for microservice deployments in one example implementation via K8 orchestration, with an Envoy controller (for example Istiod) that sets rules and other configurations for proxy (Envoy) 344 corresponding to the primary container to which the proxy attaches. The disclosed technology extends the behavior of the proxy sidecar to manage security tokens which are passed to microservices.

In the process of confirming delegation of authorization from authorization server 105 by a user/resource owner 102 to a service via the use of auth info 244, 264 for associating the access token, one client service can provide an access token to a second client service, which can then access resource server 142 without needing to authenticate their user/resource holder. This typically occurs in microservices environments in which a single request may get passed from one service to another as part of processing. Service 238 sends a request for a microservice via inter-service message 354 to proxy (Envoy) 344 of service 236. Inter-service message 354 includes an encrypted security token, designated as A in FIG. 3, and a decrypted new service token, $T_1$, which contains the information required for the specified microservice. Proxy 344 is described in FIG. 4, and shown magnified relative to FIG. 3.

In a zero-trust environment, the developer does not want each microservice to see full details of a security token which has been provided by an external service. The disclosed technology includes the large, encrypted token provided by an external provider in a service request message header and the proxy decrypts the large security token and then passes a smaller security token to a microservice so that the microservice has only the information it needs. In one use case example, an initial call to place an order might result in subsequent calls to a billing service, a stock checking service, and then to a fulfillment service of some kind. Each of those services may need to access different distinct details about the user from a "user info" resource server. An initial access token granting access to that user info can be transferred from one service to the next as processing proceeds.

Figure 4:
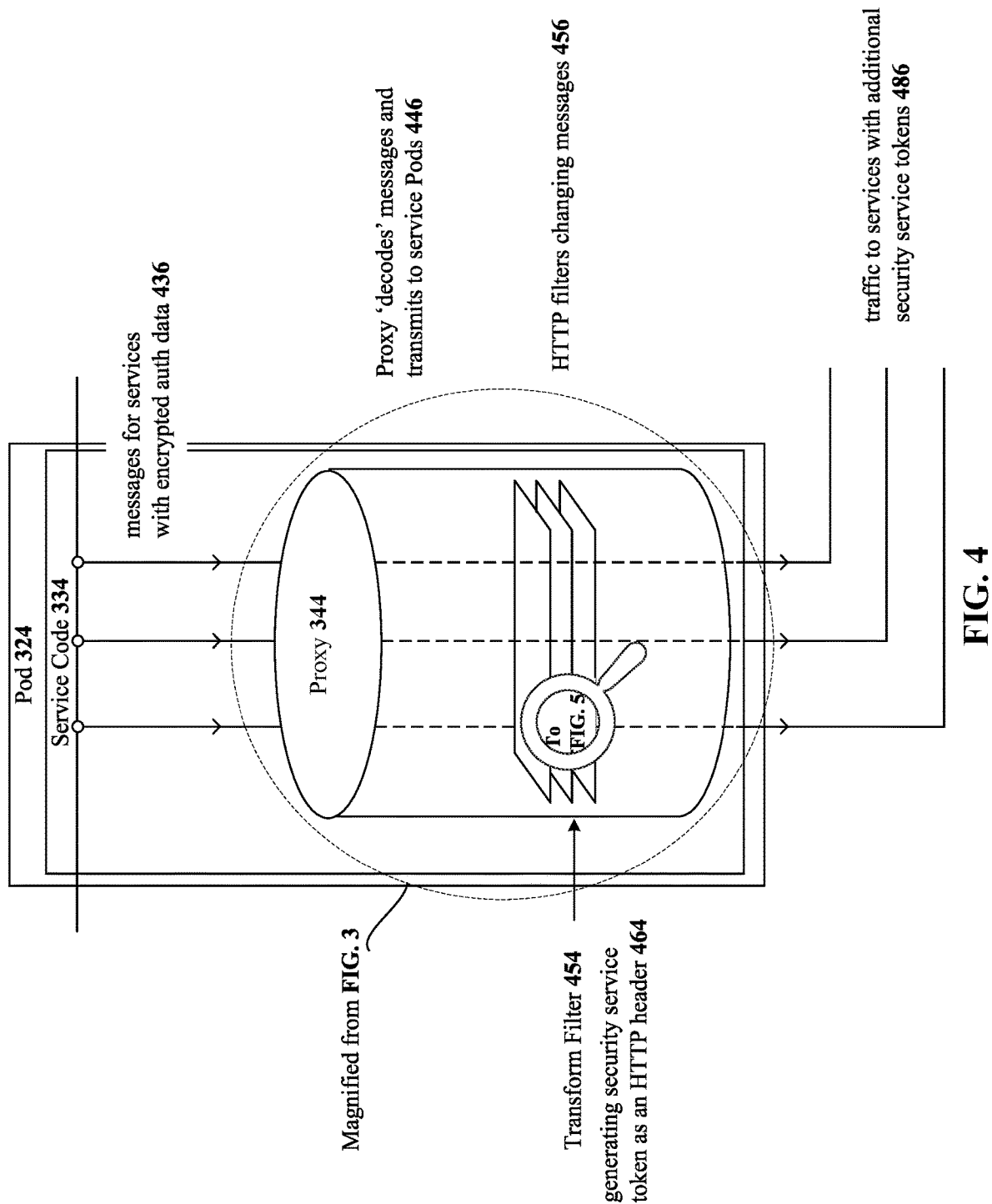
FIG. 4 shows the functionality for the proxy of the pod illustrated in FIG. 3.

FIG. 4 shows the functionality for proxy 344 of pod 324 with service code 334, as illustrated via the dotted area, which is magnified from FIG. 3. Messages for services with encrypted auth data 436 enter proxy 344 which decodes the messages 446, handling the incoming request which is routed downstream to another container in the service mesh. Transform filter 454 changes the messages 456, generating a security service token in an http or https header 464. Proxy 344 sends traffic to services with additional security service tokens 486. Grant Negotiation and Authorization Protocol (GNAP) tokens could be generated in another implementation (see https://datatracker.ietf.org/wg/gnap/documents/ accessed Nov. 17, 2021).

Figure 5:
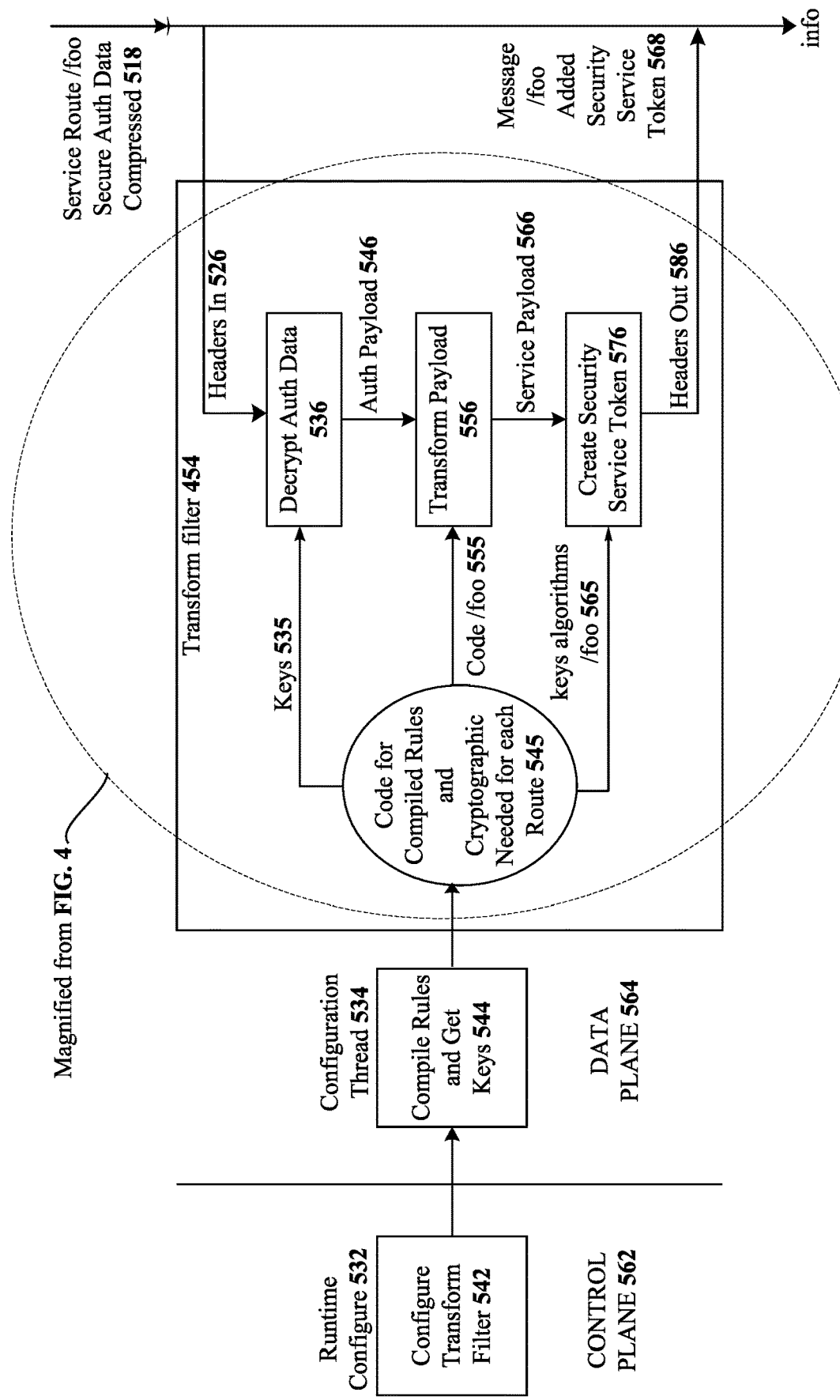
FIG. 5 illustrates the functionality of the disclosed transform filter.

FIG. 5 illustrates the functionality of disclosed transform filter 454 that transforms the payload of an encrypted security token and decrypts the encrypted security token to create a new security service token which only contains the information required for the specified microservice.

Cloud application software mesh 226 utilizes control plane 562 and data plane 564. Control plane 562 implements a universal data plane API, which manages and injects the proxies in each of the microservice pods. Control plane 562 interacts with the proxies to push configurations, ensure service discovery, and centralize observability. The control plane component, called Istiod, manages and injects the Envoy proxies in each of the microservice pods, in one implementation. Runtime configure 532 configures transform filter 542. The control plane utilizes Istiod in one implementation, with added disclosed transform filters that are linked at runtime, whenever the filter configuration is changed. Data plane 564 handles traffic management, using an Envoy sidecar proxy to route traffic and calls between services, deploying disclosed lightweight proxies with configuration thread 534 to compile rules and get encryption keys 544. The disclosed technology configures the cryptography for security tokens and has a high-functionality transformation language for the security token payload. The benefits include ease of configuration, avoiding complexity. Proxies for the applications are sets of network proxies that automatically handle the traffic to and from the service mesh. For Istio service meshes, the proxies are Envoy proxies, in one implementation.

Continuing the description of FIG. 5 and details of the flow for transform filter 454, code for compiled rules and cryptographic needed for each route through the microservices 545 transmits keys 535 to decrypt auth data 536, sends code 555 to transform payload 556 and sends keys algorithms 565 to create security service token 576. Incoming encrypted security tokens with secure auth data (compressed) 518 are routed as depicted as 'headers in' 526 to decrypt auth data 536. Decrypt auth data 536 decrypts the encrypted security token and transmits the decrypted auth payload 546 to transform payload 556. Three examples of transformation rules that are applied as local transformations are described below. Code 555 from code compiled rules and cryptographic need for each route 545 combines with auth payload 546 in transform payload 556, which sends service payload 566 to create service token 576. Create security service token 576 utilizes the keys algorithms 565 to create the new security service token that is specific to the rules and route of a particular microservice, as described above. Create service token 576 wraps the service request message header with an additional header for the respective microservice and sends 'headers out' 586, concatenated to 'headers in' 526 to generate the message added security service token 568. The respective microservice receives and consumes its own respective individual portion of information without having access to additional individual portions of information directed to other microservices.

The disclosed technology enables developers to avoid sharing sensitive information, such as this kind of financial information, within a cloud application. An example security token payload with consented authorization details, listed below, provides resource server (RS) 142 with the authorization details applicable to it as a top-level JSON element, along with the claims the RS requires for request processing. This is an RFC example of a security token with complex authorization data for a financial transaction. The authorization for this example involves consent from the authenticated user via authorization server 105. The details of the financial transaction are not as important as the idea that there is a standard way to capture this kind of complex authorization. This example security token payload only contains authorization details for a financial transaction. The actions field in this detail is assumed to indicate the kind of operations that have been authorized for the application, including initiating the transaction, monitoring its status, and canceling it.

```
{
"active": true,
"sub": "24400320",
"aud": "s6BhdRkqt3",
"exp": 1311281970,
"acr": "psd2_sca",
"txn": "8b4729cc-32e4-4370-8cf0-5796154d1296",
"authorization_details":
  [
    {
    "type": "https://www.someorg.com/payment_initiation",
    "actions": [ "initiate", "status", "cancel" ],
    "locations": [ "https://example.com/payments" ],
    "instructedAmount": { "currency": "EUR", "amount": "123.50" },
    "creditorName": "Merchant123",
    "creditorAccount": { "iban": "DE021001001093071118603" },
    "remittanceInformationUnstructured": "Ref Number Merchant"
    }
  ],
"debtorAccount": { "iban": "DE40100100103307118608",
"user_role": "owner" },
"transactionRef":12345678901234
}
```

Listed next is the example payload as a standard encrypted token with base information used by the microservice chain, overall, and respective individual portions of information for respective microservices in the microservice chain. The security token, which is encrypted with symmetric key encryption and compression, is referred to as 'secure auth data (compressed) 518' and depicted as 'headers in' 526 in FIG. 5.

```
eyJraWQiOiJkZWZhdWx0LXN5bWV0cmljLWtleSIsImVuYyI6IkEyNTZHQ00iLCJhbGci
OiJESVIiLCJ6aXAiOiJERUYifQ..n69I1qYp1HJMWf7JLAClcQ.jGOzw3wml9q4hy_UZn
YYSjYGfwgpfI0ub4aMViVrMChhHVHapinpbceoUsz6hRa8z-FJ-
_mAYys0GFpcmC9OdgdKsg7gemBsJdQiD98WVa6ed0NrrjoCbdUpvtkx69MUeXHuH2G
qOwmZrTLH-URyCbAZWcHEKzJxIHv1-phBOI4Zgm2ZsWoPwwg-
gzVZn5SDYQKgyqfIHLjPO7x-
GHLNda7QtLGiIlIIAjIEvK7j23d9oFqrRMv29ByYW6ZR9iEp_Ol9gfw-
CHAUWx0pjXvs7ndIGN7RpbRwuwEQdhkwRCatx1sJyFQq846xi6kIFwX0Ilq7-
VHHFSISpI3hp1azToXP6eh--
wULeQorPOuGgSjifhsIyd11LcLhznJV6kSg0FJP4ffJljX1ja4rtlaPZKVkm7Qxnoibl5tUb347
vnEPzpt9GmVkEhrBUk6Xmyl5Mnw0NAo1BNycmrMfZsLiNqpSl1IJViu4fRPBmaz5RgZ
PzPytjHP6pB1bHGaOoyGKQO2ZFiPhxMkIJPBIvHG_MmELkr47thcv_Jcw6JQ-
cctsQ6qUApKkNg.JRq68z_gtKPzO4zHCPttjQ
```

Next, we list three distinct transformation rules for three example microservices, with descriptions and specifications of the kind of security tokens they need. The transformations are examples of how information from an Authorization Server can be repurposed and restricted for different services. This is a security measure, ensuring that the Authorization Server does not over-share sensitive data within a cloud application. The transforms apply to a respective individual portion of information and make the respective individual portion of information available for processing at the respective microservice. That is, the rules operate on security tokens with the structure shown in the example payload listed above. The rules also specify that the generated security tokens are signed using the algorithm ES256 and a particular key identified by ec-256. In another scenario these encryption signatures could be different for each route, or different encryption algorithms could be specified. They identify the services by the prefix of their service paths in the service mesh. One service is identified by "/initiate", and it will initiate and cancel financial transactions, which requires a security token with the authorized transaction details. In this example scenario, there are also services for financial transaction auditing and cancellation. These are configured by these rules to receive less information from the input payload. The disclosed technology prevents information leak caused by sharing authorization tokens across different services in a cloud application, which would be a problem for zero-trust scenarios.

The first example is a transformation for an audit service that does not need to see the financial details. This rule references data in the outermost context of the data source, which is the context in which standard claims are represented in the input payload. Sub, aud and exp are copied directly, and the others are constructed from various values referenced in the security token's outer context.

prefix:/audit
    alg:ES256
    kid:ec-256
    description: This service only needs the transaction ref and account. The scope is set to the user's role for the account.

```
rule:
{
    sub,
    aud,
    exp,
    "scope" : debtorAccount.user_role,
    "account" : debtorAccount.iban,
    "ref": transactionRef
}
```

The transformation rule listed above transforms the example payload into the signed security token and payload listed next.

```
eyJ0eXAiOiJKV1QiLCJraWQiOiJlYy0yNTYiLCJhbGciOiJFUzI1NiJ9.eyJzdWIiOiIyNDQ
wMDMyMCIsImF1ZCI6InM2QmhkUmtxdDMiLCJleHAiOjEzMTEyODE5NzAsInNjb3Bl
Ijoib3duZXIiLCJhY2NvdW50IjoiREU0MDEwMDEwMDEwMzMwNzExODYwOCIsInJl
ZiI6MTIzNDU2Nzg5MDEyMzR9.RBX2p8RzN2XzeyTNZMWJcaXQrtlTt1g33_SxQkGJa
mZ7I3fVLT9any7AONURt-0CEGd76Lez4ZG_797hjfxC1w
{"sub":"24400320","aud":"s6BhdRkqt3","exp":1311281970,"scope":"owner","account":"D
E40100100103307118608","ref":12345678901234}
```

The second example generates a security token for a service that initiates the financial transaction. This transform also copies the standard sub, aud and exp claims directly from the outermost context of the data source, but it additionally constructs claims from the authorization details array. In the transformation language, parentheses are used to mark a context with its own data sources, which is here the selected authorization detail, and then within that context the actions array. The built-in symbol $ is used to refer back to data in the top-level context of the input security token. This rule produces the scope claim as an array rather than as the normal concatenated string of scope names.

prefix:/initiate
    alg:ES256
    kid:ec-256
    description: this service needs transfer details and transaction identifier for the consented-to authorization details of type "https://www.someorg.com/paymen-t_initiation"; format the financial value and account information, set scope to a filtered set of the actions.

```
rule:
{
    sub,
    aud,
    exp,
    (
    "scope": [ a from actions a where a in [ "initiate", "cancel" ] ],
    "debit": { "acc": $.debtorAccount.iban, "val":
```

-continued

```
   instructedAmount.amount, "ccy": instructedAmount.currency },
     "ref": $.transactionRef,
     "credit": creditorAccount.iban
     from authorization_details where type =
     "https://www.someorg.com/payment_initiation"
     )
  }
```

This transforms the example payload into the signed security token and payload listed next.

```
eyJ0eXAiOiJKV1QiLCJraWQiOiJlYy0yNTYiLCJhbGciOiJFUzI1NiJ9.eyJzdWIiOiIyNDQ
wMDMyMCIsImF1ZCI6InM2QmhkUmtxdDMiLCJleHAiOjEzMTEyODE5NzAsInNjb3Bl
IjpbImluaXRpYXRlIiwiY2FuY2VsIl0sImRlYml0Ijp7ImFjYyI6IkRFNDAxMDAxMDAxM
DMzMDcxMTg2MDgiLCJ2YWwiOiIxMjMuNTAiLCJjY3kiOiJFVVIifSwicmVmIjoxMj
M0NTY3ODkwMTIzNCwiY3JlZGl0IjoiREUwMjEwMDEwMDEwOTMwNzExODYwM
yJ9.PKytwAK-C94meVnWRwd5bJ98SLItlrAEI1Ld6NBFgEigcPH5-
YaaFUokGb2hEHY8l-aIRH0v40ks-UhcLIKvTQ
{"sub":"24400320","aud":"s6BhdRkqt3","exp":1311281970,"scope":["initiate","cancel"],"d
ebit":{"acc":"DE40100100103307118608","val":"123.50","ccy":"EUR"},"ref":1234567890
1234,"credit":"DE02100100109307118603"}
```

A third example shows more about how the scope claim can be derived from the input structure for a particular service. In the transformation language, the $concat operator will concatenate an array of scope names into the conventional format, a string of scope names. The rule also shows how variables can be used in the transformation language. As in SQL, variables such as 'd' and 'a' in this rule can be used to explicitly reference data sources that are identified in from-clauses.

prefix:/cancel
alg:ES256
kid:ec-256
description: This service does not need transfer details, only the transaction ref. The scope claim is always set to "view", but "cancel" is concatenated to the scope claim if the user is the account owner and the application can initiate the transfer.

```
   rule:
   {
     sub,
     aud,
     exp,
     (
       "scope": $concat [ "view", ( "cancel" from d.actions a where
   a = "initiate" and $.debtorAccount.user_role = "owner" ) ],
       "account": $.debtorAccount.iban,
       "ref": $.transactionRef
       from authorization_details d where d.type =
       "https://www.someorg.com/payment_initiation"
       )
   }
```

This transforms the example payload into the signed security token and payload listed next.

```
eyJ0eXAiOiJKV1QiLCJraWQiOiJlYy0yNTYiLCJhbGciOiJFUzI1NiJ9.eyJzdWIiOiIyNDQ
wMDMyMCIsImF1ZCI6InM2QmhkUmtxdDMiLCJleHAiOjEzMTEyODE5NzAsInNjb3Bl
IjoidmlldyBjYW5jZWwiLCJhY2NvdW50IjoiREU0MDEwMDEwMDEwMzMwNzExOD
YwOCIsInJlZiI6MTIzNDU2Nzg5MDEyMzR9.afi7Oaefwq3-
pLmTQs3c2D3VaIx9hY1R69fzrY6jBQS1mlWjPgOk7jb0hO6w6P_CDDxV0ByiHLkVYO
g0Us9K9Q
{"sub":"24400320","aud":"s6BhdRkqt3","exp":1311281970,"scope":"view
cancel","account":"DE40100100103307118608","ref":12345678901234}
```

At each respective microservice, the disclosed granular sharing of parts of an authorization token among individual microservices in a microservice chain, includes applying a local transform to a respective individual portion of information and making the respective individual portion of information available for processing at the respective microservice. The compiled rules are applied for each route. The respective microservice consumes its own respective individual portion of information without having access to additional individual portions of information directed to other microservices.

The disclosed technology operates autonomously without calling out to an Authorization Server. Calling out to a central Authorization Server would be prohibitively slow in the microservice world. The service mesh with microservices can be implemented in Google Cloud Platform (GCP) in one example, and in Amazon Wed Services (AWS) platform, or Microsoft Azure platform, or another platform that can accommodate microservice meshes.

The disclosed technology allows microservices in cloud applications to use standard authorization practices and technology with secure authorization tokens. The disclosed technology also supports non-disruptive software updates, in which software can be updated and operations can be reconfigured in real time across the service mesh independently of the application and service mesh software, so that it is serviceable.

We describe a representative computer system for granular sharing of parts of an authorization token among individual microservices in a microservice chain, and for adapting a microservice proxy, within an individual microservice in a microservice chain, to access an individual portion of information packaged with base information applicable to the chain, overall, in an encrypted security token next.

Computer System

Figure 6:
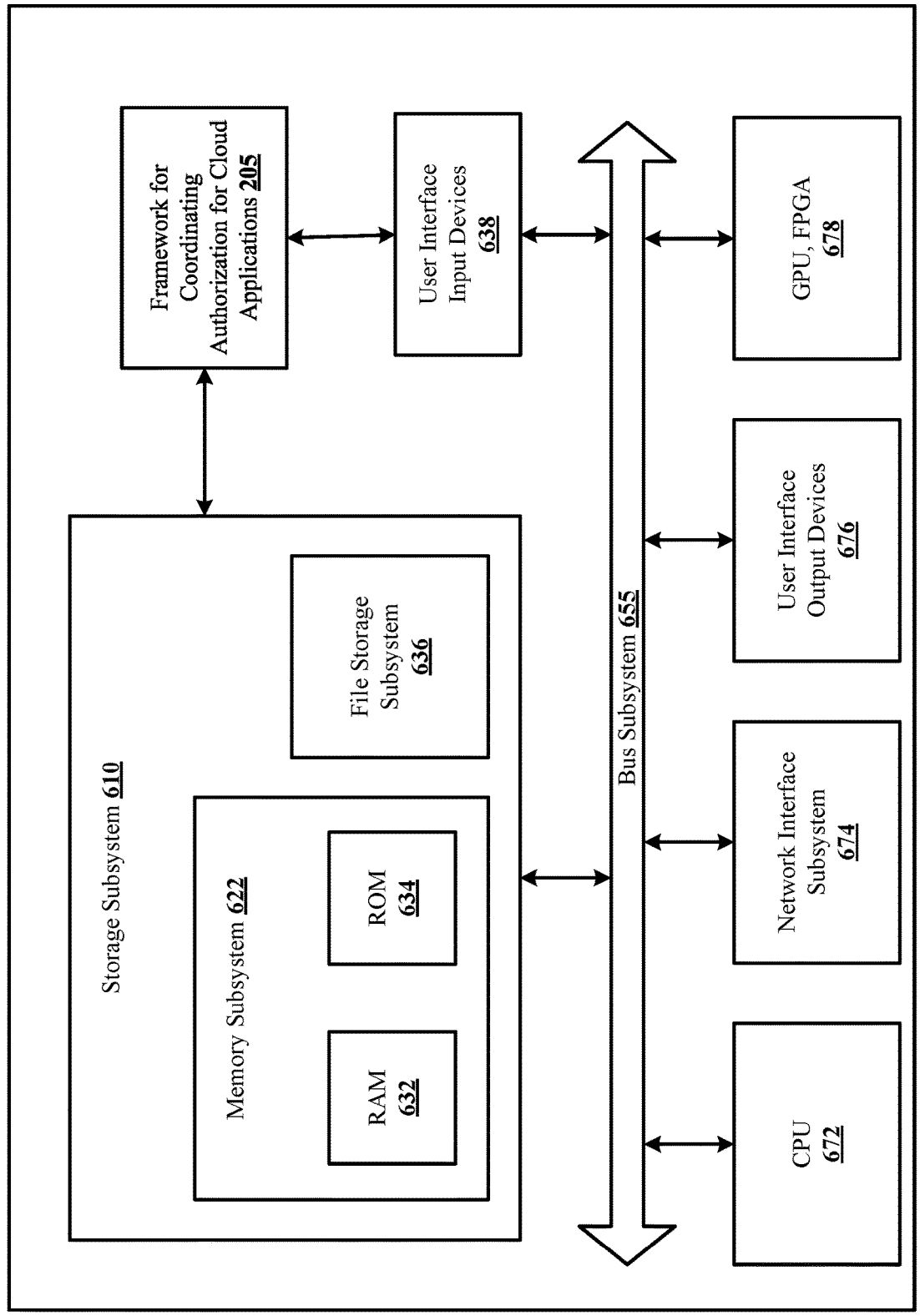
FIG. 6 is a simplified block diagram of a computer system that can be used for granular sharing of parts of an authorization token among individual microservices in a microservice chain, and for adapting a microservice proxy, within an individual microservice in a microservice chain, to access an individual portion of information packaged with base information applicable to the chain, overall, in an encrypted token, according to one embodiment of the disclosed technology.

FIG. 6 is a simplified block diagram of a computer system 600 that can be used for granular sharing of parts of an authorization token among individual microservices in a microservice chain, and for adapting a microservice proxy, within an individual microservice in a microservice chain, to access an individual portion of information packaged with base information applicable to the chain, overall, in an encrypted token. Computer system 600 includes at least one central processing unit (CPU) 672 that communicates with a number of peripheral devices via bus subsystem 655, and framework for coordinating authorization for cloud applications 205 for delegation of authority using bearer tokens, as described herein. These peripheral devices can include a storage subsystem 610 including, for example, memory devices and a file storage subsystem 636, user interface input devices 638, user interface output devices 676, and a network interface subsystem 674. The input and output devices allow user interaction with computer system 600. Network interface subsystem 674 provides an interface to outside networks, including an interface to corresponding interface devices in other computer systems. Framework for coordinating authorization for cloud applications 205 of FIG. 2 is communicably linked to the storage subsystem 610 and the user interface input devices 638.

User interface input devices 638 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 600.

User interface output devices 676 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 600 to the user or to another machine or computer system.

Storage subsystem 610 stores programming and data constructs that provide the functionality of some or all of the modules and methods described herein. Subsystem 678 can be graphics processing units (GPUs) or field-programmable gate arrays (FPGAs).

Memory subsystem 622 used in the storage subsystem 610 can include a number of memories including a main random-access memory (RAM) 632 for storage of instructions and data during program execution and a read only memory (ROM) 634 in which fixed instructions are stored. A file storage subsystem 636 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 636 in the storage subsystem 610, or in other machines accessible by the processor.

Bus subsystem 655 provides a mechanism for letting the various components and subsystems of computer system 600 communicate with each other as intended. Although bus subsystem 655 is shown schematically as a single bus, alternative implementations of the bus subsystem can use multiple buses.

Computer system 600 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 600 depicted in FIG. 6 is intended only as a specific example for purposes of illustrating the preferred embodiments of the present invention. Many other configurations of computer system 600 are possible having more or fewer components than the computer system depicted in FIG. 6.

Particular Implementations

We describe some implementations and features for granular sharing of parts of an authorization token among individual microservices in a microservice chain, and for adapting a microservice proxy, within an individual microservice in a microservice chain, to access an individual portion of information packaged with base information applicable to the chain, overall, in an encrypted token in the following discussion.

One implementation discloses a method of granular sharing of parts of an authorization token among individual microservices in a microservice chain, including packaging in an encrypted token base information used by the microservice chain, overall, and respective individual portions of information for respective microservices in the microservice chain. The disclosed method also includes receiving the token, with a service request message, at an entry point to the microservice chain, decrypting the base information and verifying authorization for initiation of the service chain with an authorization service. Further included is routing the service request and at least part of the encrypted token among the microservices in the microservice chain. The disclosed method also includes at each respective microservice, applying a local transform to a respective individual portion of information and making the respective individual portion of information available for processing at the respective microservice, and the respective microservice consuming its own respective individual portion of information without having access to additional individual portions of information directed to other microservices.

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

Many implementations of the method also include receiving the token with the service request message in a service request message header. Some implementations of the method further include a proxy decrypting, formatting, and wrapping the service request message header with an additional header for the respective microservice.

In some implementations of the disclosed method, the additional header includes an authorization token for the respective microservice.

One implementation discloses a method of adapting a microservice proxy, within an individual microservice in a microservice chain, to access an individual portion of information packaged with base information applicable to the chain, overall, in an encrypted token. The disclosed method includes the microservice proxy receiving the encrypted token, with a service request message, at an entry point to the microservice chain, and the encrypted token includes base information used by the microservice chain, overall, and respective individual portions of information for respective microservices in the microservice chain. The method also includes the microservice proxy, at each respective microservice, decrypting a respective individual portion of the information and applying a local rule to transform the respective microservice's own respective individual portion of the information and make it available for processing at the respective microservice. The disclosed method further includes the respective microservice consuming its own individual portion of the information without providing decrypted access to the individual portions of the information directed to other microservices. Many implementations further include receiving the encrypted token with the service request message in a service request message header. Some implementations of the disclosed method further include the microservice proxy decrypting, formatting, and wrapping the service request message header with an additional header for the respective microservice.

Other implementations of the disclosed technology described in this section can include a tangible non-transitory computer readable storage media, including program instructions loaded into memory that, when executed on processors, cause the processors to perform any of the methods described above. Yet another implementation of the disclosed technology described in this section can include a system including memory and one or more processors operable to execute computer instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

What is claimed is:

1. A method of granular sharing of parts of an authorization token among individual microservices in a microservice chain, including:
    packaging in an encrypted token:
        base information used by the microservice chain, overall, and
        respective individual portions of information for respective microservices in the microservice chain;
    receiving the encrypted token, with a service request message, at an entry point to the microservice chain, decrypting the base information, verifying authorization for initiation of the microservice chain with an authorization service, and encrypting, in a new token, one or more respective individual portions of the information for a respective microservice;
    routing the service request and the new token among the microservices in the microservice chain; and
    at each respective microservice,
        applying a local transform to the respective individual portion of information and making the respective individual portion of information available for processing at the respective microservice; and
        the respective microservice consuming its own respective individual portion of information without having access to additional individual portions of information directed to other microservices.

2. The method of claim 1, further including receiving the encrypted token with the service request message in a service request message header.

3. The method of claim 2, further including a proxy decrypting, formatting, and wrapping the service request message header with an additional header for the respective microservice.

4. The method of claim 3, wherein the additional header includes an authorization token for the respective microservice.

5. A method of adapting a microservice proxy, within an individual microservice in a microservice chain, to access an individual portion of information packaged with base information applicable to the chain, overall, in an encrypted token, including:
    the microservice proxy receiving the encrypted token, with a service request message, at an entry point to the microservice chain, wherein the encrypted token includes base information used by the microservice chain, overall, and
        respective individual portions of information for respective microservice in the microservice chain; and
        encrypting, in a new token, one or more respective individual portions of the information for a respective microservice;
    the microservice proxy, at each respective microservice, decrypting a respective individual portion of the information from the new token;
        applying a local rule to transform the respective microservice's own respective individual portion of the information and make it available for processing at the respective microservice; and
        the respective microservice consuming its own individual portion of the information without providing decrypted access to the individual portions of the information directed to other microservices.

6. The method of claim 5, further including receiving the encrypted token with the service request message in a service request message header.

7. The method of claim 6, further including the microservice proxy decrypting, formatting, and wrapping the service request message header with an additional header for the respective microservice.

8. A tangible non-transitory computer readable storage media, including program instructions loaded into memory that, when executed on processors, cause the processors to implement a method of granular sharing of parts of an authorization token among individual microservices in a microservice chain, the method including:
    packaging in an encrypted token:
        base information used by the microservice chain, overall, and
        respective individual portions of information for respective microservices in the microservice chain;
    receiving the encrypted token, with a service request message, at an entry point to the microservice chain, decrypting the base information, verifying authorization for initiation of the microservice chain with an authorization service, and encrypting, in a new token, one or more respective individual portions of the information for a respective microservice;
    routing the service request and the new token among the microservices in the microservice chain; and
    at each respective microservice,
        applying a local transform to the respective individual portion of information and making the respective individual portion of information available for processing at the respective microservice; and the respective microservice consuming its own respective individual portion of information without having access to additional individual portions of information directed to other microservices.

9. The tangible non-transitory computer readable storage media of claim 8, further including receiving the encrypted token with the service request message, in a service request message header.

10. The tangible non-transitory computer readable storage media of claim 9, further including a proxy decrypting, formatting, and wrapping the service request message header with an additional header for the respective microservice.

11. The tangible non-transitory computer readable storage media of claim 10, wherein the additional header includes an authorization token for the respective microservice.

12. A system for granular sharing of parts of an authorization token among individual microservices in a microservice chain, the system including a processor, memory coupled to the processor and program instructions from the non-transitory computer readable storage media of claim 8 loaded into the memory.

13. The system of claim 12, wherein the program instructions extend the method including receiving the encrypted token with the service request message in a service request message header.

14. The system of claim 13, wherein the program instructions extend the method including a proxy decrypting, formatting, and wrapping the service request message header with an additional header for the respective microservice.

15. The system of claim 14, wherein the program instructions extend the method wherein the additional header includes an authorization token for the respective microservice.

16. A tangible non-transitory computer readable storage media, including program instructions loaded into memory that, when executed on processors, cause the processors to implement a method of adapting a microservice proxy, within an individual microservice in a microservice chain, to access an individual portion of information packaged with base information applicable to the chain, overall, in an encrypted token, the method including:
the microservice proxy receiving the encrypted token, with a service request message, at an entry point to the microservice chain, wherein the encrypted token includes base information used by the microservice chain, overall, and
respective individual portions of information for respective microservice in the microservice chain; and
encrypting, in a new token, one or more respective individual portions of the information for a respective microservice;
the microservice proxy, at each respective microservice, decrypting a respective individual portion of the information from the new token;
applying a local rule to transform the respective microservice's own respective individual portion of the information and make it available for processing at the respective microservice; and
the respective microservice consuming its own individual portion of the information without providing decrypted access to the individual portions of the information directed to other microservices.

17. The tangible non-transitory computer readable storage media of claim 16, further including receiving the encrypted token with the service request message in a service request message header.

18. The tangible non-transitory computer readable storage media of claim 17, further including the microservice proxy decrypting, formatting, and wrapping the service request message header with an additional header for the respective microservice.

19. A system to implement a method of adapting a microservice proxy, within an individual microservice in a microservice chain, to access an individual portion of information packaged with base information applicable to the chain, overall, in an encrypted token, the system including a processor, memory coupled to the processor and program instructions from the non-transitory computer readable storage media of claim 16 loaded into the memory.

20. The system of claim 19, further including receiving the encrypted token with the service request message in a service request message header.

21. The system of claim 20, further including the microservice proxy decrypting, formatting, and wrapping the service request message header with an additional header for the respective microservice.

\* \* \* \* \*